United States Patent
Maj et al.

(10) Patent No.: US 6,357,821 B1
(45) Date of Patent: Mar. 19, 2002

(54) LAMP CAN AND RADIATOR SUPPORT ASSEMBLY

(75) Inventors: Michael Henry Maj, Livonia; Jason Scott Balzer, Canton; Paul Kenneth Dellock, Northville, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/685,959

(22) Filed: Oct. 13, 2000

Related U.S. Application Data

(60) Provisional application No. 60/159,180, filed on Oct. 13, 1999.

(51) Int. Cl.[7] .............................................. B62D 25/08
(52) U.S. Cl. .................................. 296/194; 296/230.02
(58) Field of Search ........................... 296/194, 203.02; 293/115

(56) References Cited

U.S. PATENT DOCUMENTS

| | | | |
|---|---|---|---|
| 5,106,148 A | * 4/1992 | Ikeda et al. ................. 296/194 |
| 5,123,695 A | * 6/1992 | Kanemitsu et al. ......... 296/194 |
| 5,209,541 A | 5/1993 | Janotik | |
| 5,213,386 A | 5/1993 | Janotik et al. | |
| 5,228,359 A | 7/1993 | Thomas | |
| 5,271,687 A | 12/1993 | Holka et al. | |
| 5,303,973 A | * 4/1994 | Fuji ........................... 296/194 |
| 5,320,403 A | 6/1994 | Kazyak | |
| 5,332,281 A | 7/1994 | Janotik et al. | |
| 5,338,080 A | 8/1994 | Janotik et al. | |
| 5,343,666 A | 9/1994 | Haddad et al. | |
| 5,358,304 A | * 10/1994 | Kanemitsu et al. ......... 296/194 |
| 5,403,048 A | 4/1995 | Ekladyous et al. | |
| 5,658,041 A | * 8/1997 | Giradot et al. .............. 296/194 |
| 5,865,500 A | * 2/1999 | Sanda et al. ................ 296/194 |
| 6,189,958 B1 | * 2/2001 | Guyomard et al. ......... 296/194 |
| 6,196,624 B1 | * 3/2001 | Bierjon ................... 296/203.02 |
| 9,216,810 | * 4/2001 | Nakai et al. ............ 296/194 X |

* cited by examiner

Primary Examiner—Joseph D. Pape
Assistant Examiner—Patricia Engle
(74) Attorney, Agent, or Firm—Raymond L. Coppiellie

(57) ABSTRACT

A lamp can and radiator support assembly is provided for a motor vehicle. The lamp can and radiator support assembly includes a radiator support for operative attachment to forward end of the motor vehicle. The lamp can and radiator support assembly also includes a pair of lamp cans attached to the radiator support. The lamp can and radiator support assembly further includes at least one crossbar interconnecting the lamp cans and attached to the radiator support for adjusting the lamp cans relative to a body of the motor vehicle.

19 Claims, 4 Drawing Sheets

LAMP CAN AND RADIATOR SUPPORT ASSEMBLY

CROSS-REFERENCE TO RELATED APPLICATION(S)

The present application claims priority from provisional application Ser. No. 60/159,180 filed Oct. 13, 1999.

BACKGROUND OF THE INVENTION

1. Field of the Invention

The present invention relates generally to radiator supports for motor vehicles and, more specifically, to a lamp can and radiator support assembly for a motor vehicle.

2. Description of the Related Art

It is known to provide a radiator support for a motor vehicle. Typically, the radiator support is made of stamped steel. The radiator support has separate components attached thereto. These components include a brace for a hood latch, a grille opening reinforcement (GOR), brackets for the GOR, and a cover for a radiator opening attached to the radiator support. Typically, a lamp housing or can having at least one lamp disposed therein is attached to the GOR which is supported on the radiator support. In addition, a bumper fascia is attached to the GOR, which is supported on the radiator support.

Although the above radiator support has worked well, it is desirable to provide a single first front structure for a motor vehicle that is die-cast, injection molded, or cast. It is also desirable to reduce weight, variable cost, and labor, while improving quality and vehicle durability, of a radiator support for a vehicle. It is further desirable to provide a radiator support that requires less package space in a vehicle. It is yet further desirable to attach the lamp can directly to a radiator support that allows front lamps to be reset. It is still further desirable to support a bumper fascia directly on the lamp cans. Therefore, there is a need in the art to provide a lamp can and radiator support assembly for a motor vehicle.

SUMMARY OF THE INVENTION

Accordingly, the present invention is a lamp can and radiator support assembly for a motor vehicle. The lamp can and radiator support assembly includes a radiator support for operative attachment to forward end of the motor vehicle. The lamp can and radiator support assembly also includes a pair of lamp cans attached to the radiator support. The lamp can and radiator support assembly further includes at least one crossbar interconnecting the lamp cans and attached to the radiator support for adjusting the lamp cans relative to a body of the motor vehicle and a bumper fascia attached to the lamp cans.

One advantage of the present invention is that a lamp can and radiator support assembly is provided for a motor vehicle. Another advantage of the present invention is that the lamp can and radiator support assembly includes a radiator support as a first front structure for the vehicle that is die-cast, injection molded, or cast. Yet another advantage of the present invention is that the lamp can and radiator support assembly combines a pair of lamp cans and radiator support to allow front lamps of the vehicle to be reset. Still another advantage of the present invention is that the lamp can and radiator support assembly uses the pair of lamp cans to directly support a bumper fascia thereon. A further advantage of the present invention is that the lamp can and radiator support assembly requires less packaging space, enabling reduction of front end overhang and supporting various styling needs, and saves a large amount of weight.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
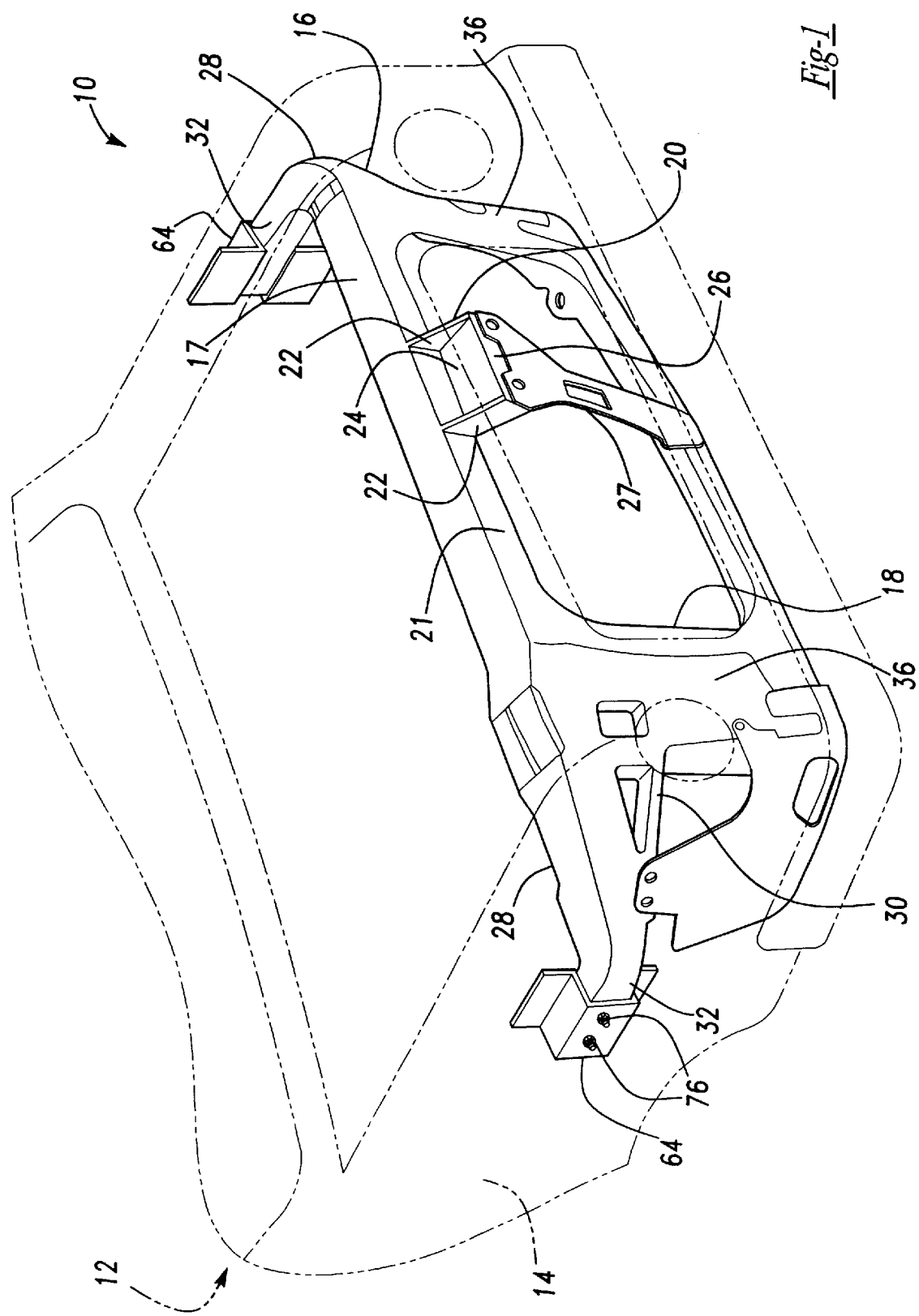
FIG. 1 is a front perspective view of a radiator support assembly, according to the present invention, illustrated in operational relationship with a motor vehicle.

Referring to the drawings and in particular FIG. 1, one embodiment of a radiator support assembly 10, according to the present invention, is illustrated in operational relationship with a motor vehicle 12. The radiator support assembly 10 is located at a forward or front end of a body 14 of the motor vehicle 12. The radiator support assembly 10 is used to support a radiator (not shown), a condenser (not shown), and/or auxiliary coolers (not shown). It should be appreciated that, except for the radiator support assembly 10, the motor vehicle 12 is conventional and known in the art.

Figure 2:
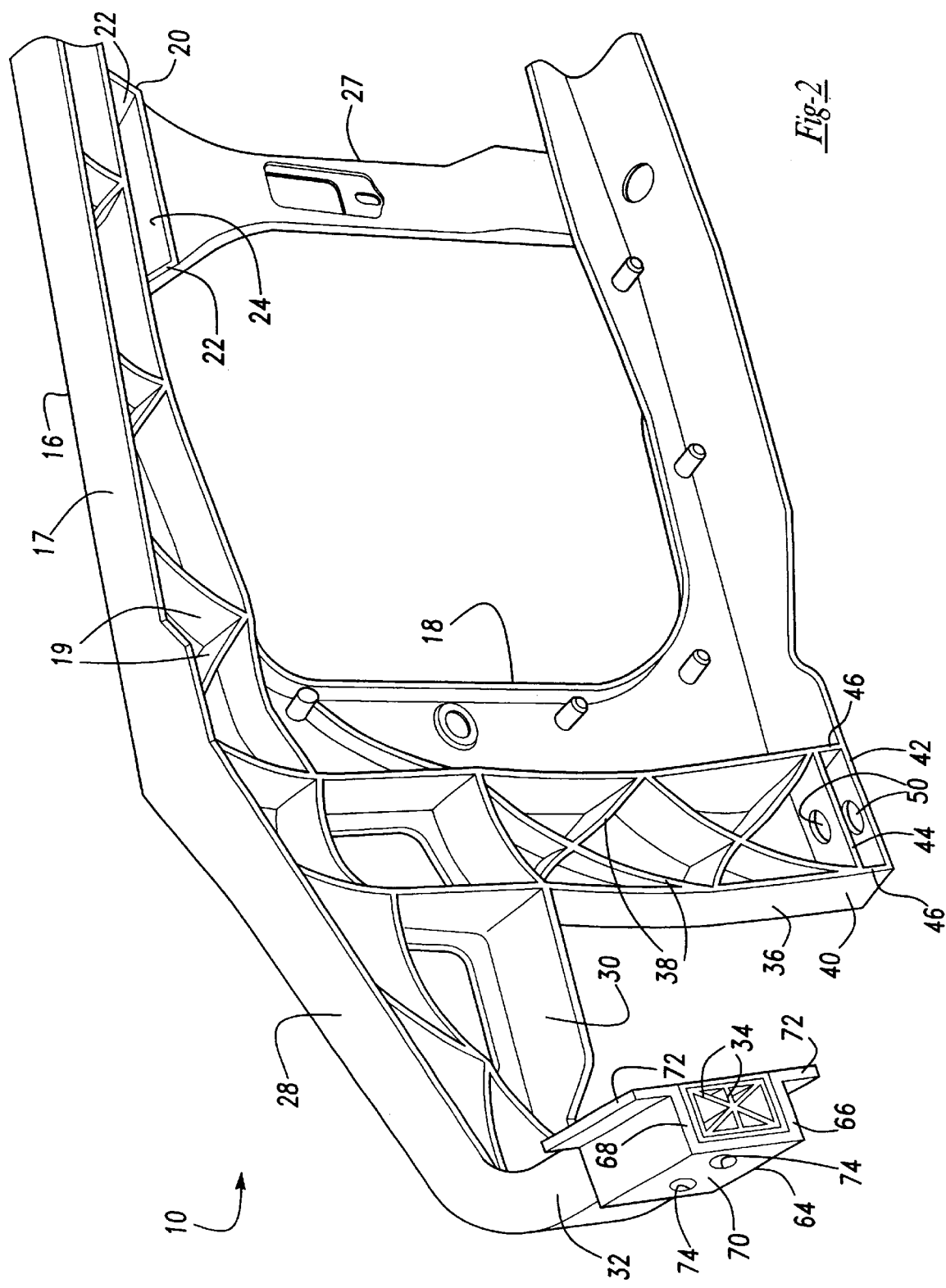
FIG. 2 is a rear perspective view of a portion of the radiator support assembly of FIG. 1.
Figure 3:
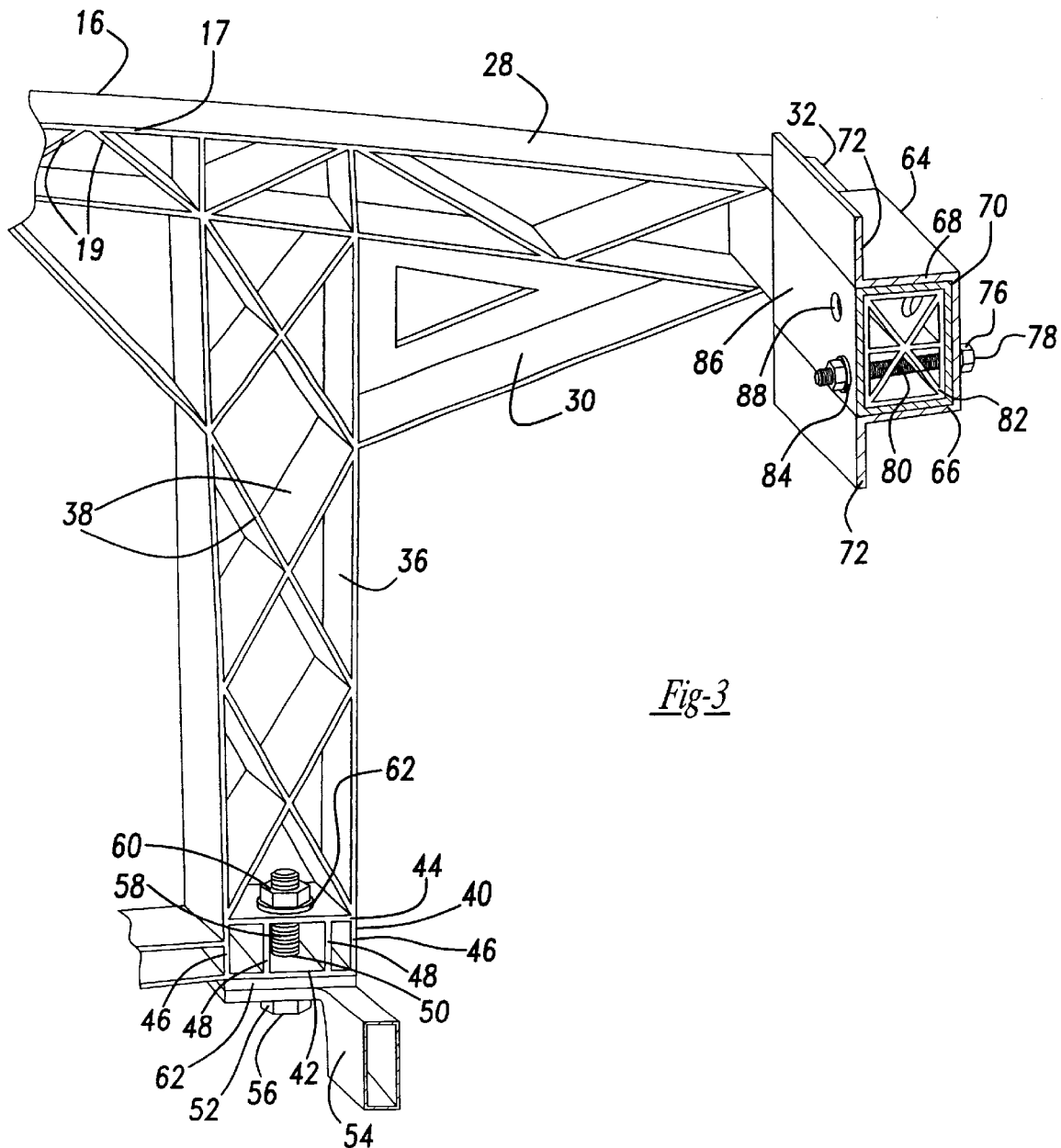
FIG. 3 is a rear perspective view of another portion of the radiator support assembly of FIG. 1.

Referring to FIGS. 1 through 3, the radiator support assembly 10 includes a radiator support 16 extending generally vertically and laterally. The radiator support 16 is generally rectangular in shape. The radiator support 16 has a front portion 17 and an opening 18 extending longitudinally through the front portion 17. The opening 18 is generally rectangular in shape. The front portion 17 may include at least one, preferably a plurality of rib portions 19 to provide stiffness and strength thereto.

The radiator support 16 also includes a hood-latch support portion 20 extending forwardly and longitudinally from a forward face 21 of the front portion 17 to support a hood-latch (not shown). The support portion 20 is generally rectangular in shape. The support portion 20 includes side walls 22 spaced laterally and extending longitudinally downwardly at an angle and a base wall 24 extending generally laterally and horizontally therebetween. The support portion 20 also includes a forward wall 26 at the forward end of the side walls 22 and base wall 24 for a function to be described. It should be appreciated that a support member 27 may extend between the support portion 20 and the front portion 17 across the opening 18 and either cast in to the radiator support 16 or be attached thereto by suitable means such as fasteners (not shown).

The radiator support 16 has a pair of arm portions 28 extending laterally outwardly from the front portion 17. The arm portions 28 are generally rectangular in shape and extend from an upper end on each side of the front portion 17. The radiator support 16 may include a brace portion 30 extending diagonally between each of the arm portions 28 and the front portion 17.

The radiator support 16 also has an attachment portion 32 extending longitudinally and rearwardly from each of the arm portions 28 for attachment to the body 14 of the motor vehicle 12. The attachment portions 32 are generally rectangular in shape. The attachment portion 32 may include at least one, preferably a plurality of rib portions 34 to provide stiffness and strength thereto.

The radiator support 16 has a pair of leg portions 36 extending generally vertically on both sides of the front portion 17. The leg portions 36 are generally rectangular in shape and are disposed on each side of the front portion 17. The leg portion 36 may include at least one, preferably a plurality of rib portions 38 to provide stiffness and strength thereto. The leg portion 36 may include a frame mount portion 40 at a lower end thereof. The frame mount portion 40 has a lower wall 42 and an upper wall 44 spaced vertically from the lower wall 42. The frame mount portion 40 also has outer walls 46 extending vertically between the lower and upper walls 42 and 44. The frame mount portion 40 may include a pair of inner walls 48 spaced laterally from the outer walls 46 and each other and extending vertically between the lower and upper walls 42 and 44. The frame mount portion 40 includes an aperture 50 extending through the lower and upper walls 42 and 44 and aligned with each other for a function to be described. It should be appreciated that the frame mount portion 40 may be of a double box section.

The radiator support 16 is made as a single structural magnesium die casting. The radiator support 16 is a monolithic structure being integral, unitary, and one-piece. The integrated radiator support 16 weighs approximately fourteen pounds.

Referring to FIG. 3, the radiator support assembly 10 includes a fastener 52 to fasten each of the leg portions 36 to a support rail 54 of a frame (not shown) of the vehicle. The fastener 52 is of a bolt type having a head 56 and a threaded shaft 58 extending through an aperture (not shown) in the support rail 54 and through the apertures 50 in the frame mount portion 40. The fastener 52 includes a nut 60 to threadably engage the shaft 58 and abut the upper wall 44. The fastener 52 is made of a metal material such as steel. It should be appreciated that the fastener 52 is conventional and known in the art.

Referring to FIG. 3, the radiator support assembly 10 includes spacers 62 between the fastener 52, the support rail 54, and the radiator support 16 to resist galvanic corrosion between the steel and magnesium. In one embodiment, the spacer 62 is a washer disposed between the nut 60 and upper wall 44. The spacer 62 is made of a metal material such as aluminum or a plastic material. In another embodiment, the spacer 62 may be a plate disposed between the support rail 54 and the lower wall 42.

Referring to FIGS. 1 through 3, the radiator support assembly 10 includes bridging brackets 64 to fasten each of the attachment portions 32 of the arm portions 28 to the body 14 of the vehicle 12. The bridging brackets 64 have a lower wall 66, an upper wall 68 spaced vertically from the lower wall 66, and a side wall 70 extending between the lower wall 66 and upper wall 68 to form a generally "U" shaped cross section. The bridging brackets 64 also have a flange 72 extending generally perpendicularly and vertically form the upper wall 68 and lower wall 66. The bridging brackets 64 have at least one, preferably a pair of apertures 74 extending through the side wall 70 for a function to be described. The bridging brackets 64 are made of a metal material such as steel. It should be appreciated that the flanges 72 are fastened or attached to an inner fender (not shown) of the body 14 of the vehicle 12 by suitable means such as welding.

The radiator support assembly 10 includes a fastener 76 to fasten each of the bridging brackets 64 to the attachment portions 32 of the radiator support 16. The fastener 76 is of a bolt type having a head 78 and a threaded shaft 80 extending through the aperture 74 in the side wall 70 and an aperture 82 in the attachment portion 32. The fastener 76 includes a nut 84 to threadably engage the shaft 80 and abut a wall of the attachment portion 32. The fastener 76 is made of a metal material such as steel. It should be appreciated that the fastener 76 is conventional and known in the art.

The radiator support assembly 10 includes spacers 86 between the fastener 76, the bridging bracket 64, and the radiator support 16 to resist galvanic corrosion between the steel and magnesium. In one embodiment, the spacer 86 is a hollow rectangular sleeve disposed about the attachment portion 32 and between the upper wall 68, lower wall 66, and side wall 70 of the bridging bracket 64. The spacer 86 has at least one, preferably a plurality of apertures 88 extending therethrough and aligned with the apertures 74 and 82 in the bridging bracket 64 and attachment portion 32, respectively. The spacer 86 is made of a metal material such as aluminum. Alternatively, the spacer 86 could be made of a thermoset plastic, which can be melted, but is not limited to melting, when the radiator support assembly 10 is painted and adheres to the bridging brackets 64 and attachment portions 32 to resist galvanic corrosion. It should be appreciated that the nut 84 abuts the spacer 86.

Figure 4:
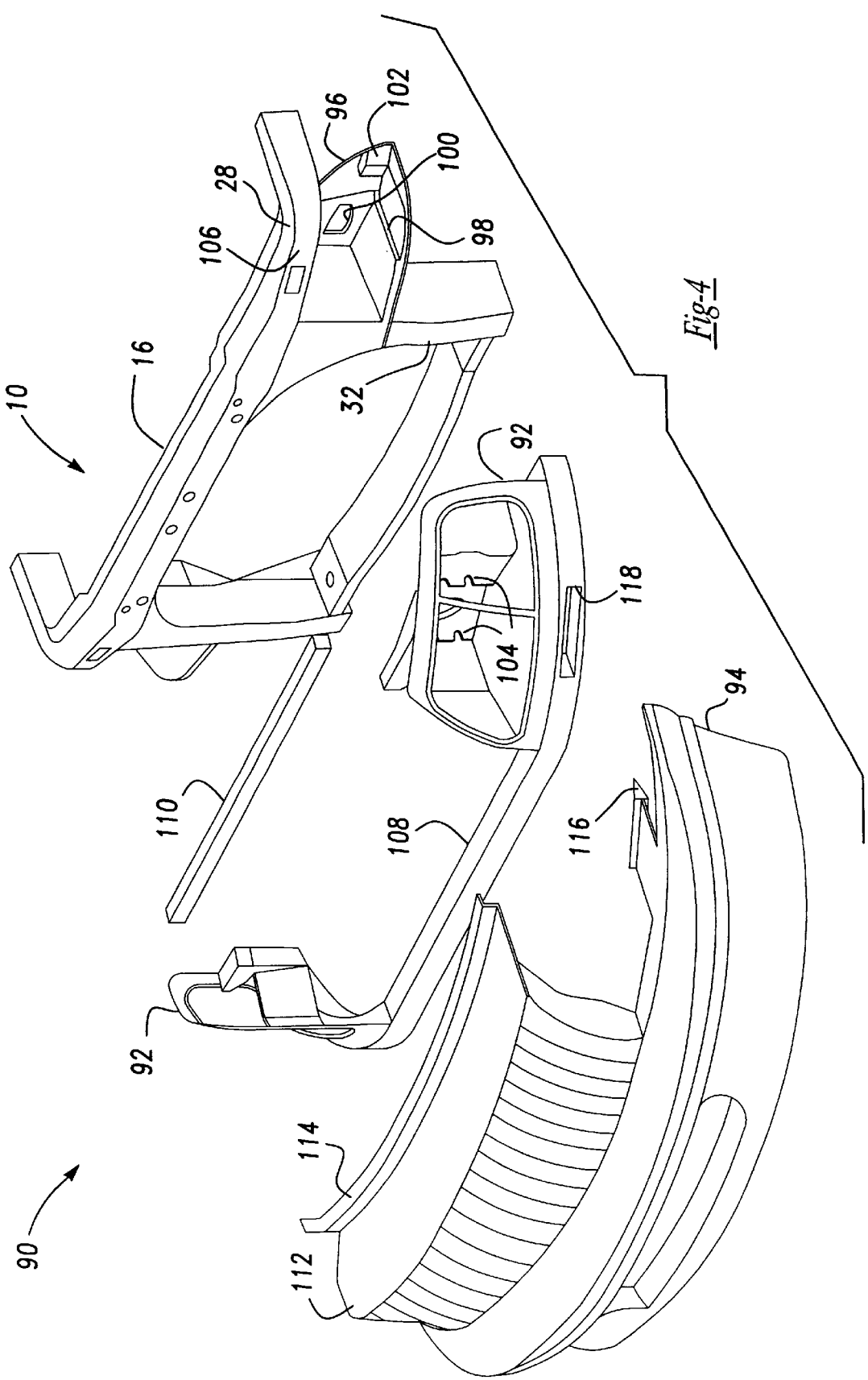
FIG. 4 is a front exploded perspective view of a lamp can and radiator support assembly, according to the present invention, illustrated in operational relationship with the radiator support assembly of FIG. 1.

Referring to FIG. 4, one embodiment of a lamp can and radiator support assembly 90, according to the present invention is illustrated in operational relationship with the radiator support assembly 10. The lamp can and radiator support assembly 90 is located at a forward or front end of the body 14 of the motor vehicle 12 and includes the radiator support assembly 10. The lamp can and radiator support assembly 90 is used to support a radiator (not shown), a condenser (not shown), and/or auxiliary coolers (not shown), a pair of lamp cans 92, and a bumper fascia 94. It should be appreciated that, except for the lamp can and radiator support assembly 90, the motor vehicle 12 is conventional and known in the art.

The lamp can and radiator support assembly 90 includes the radiator support 16 of the radiator support assembly 10. The radiator support 16 extends laterally and includes an extension 96 disposed beneath each of the arm portions 28 and laterally adjacent to each of the leg portions 36. The extension 96 includes a cavity 98 being generally rectangular in shape to receive one of the lamp cans 92. The extension 96 has an opening or aperture 100 extending therethrough at a rear of the cavity 98. The extension 96 also includes a flange or bracket 102 at each lateral end for attachment to the body 14 of the vehicle 12. The flange 102 is fastened to the body 14 by suitable means such as fasteners (not shown). The extension 96 may be part of the radiator support 16 and formed as a single structural magnesium die casting. The extension 96 may also be a separate member attached to the radiator support 16 by suitable means such as fasteners (not shown). It should be appreciated that the attachment portion 32 of the radiator support 16 is modified to form the extension 96.

The lamp can and radiator support assembly 90 includes the lamp cans 92. The lamp can 92 is a fixed lamp modular assembly having a headlamp (not shown), side marker lamp (not shown), park/turn lamps (not shown) in a plastic housing as one unit. One of the lamp cans 92 is disposed in each of the cavities 100 of the extension 96. The lamp can 92 is connected to the extension 96 by projections 104 on a rear of the lamp can 92 extending through apertures 106 in the extension 96. It should be appreciated that fasteners (not shown) may be used to further secure the lamp can 92 to the extension 96. It should also be appreciated that the lamp can 92 is conventional and known in the art.

The lamp can and radiator support assembly 90 includes a first or lower crossbar 108 interconnecting the lamp cans 92. The lower crossbar 108 is generally rectangular and tubular in shape. The lower crossbar 108 extends laterally and disposed between lower ends of the lamp cans 92. The lower crossbar 108 is made of a rigid material such as plastic. The lower crossbar 108 is secured to each of the lamp cans 92 by suitable means such as welding. The lower crossbar 108 is secured to the radiator support 16 by suitable means such as welding or fasteners (not shown).

The lamp can and radiator support assembly 90 includes a second or upper crossbar 110 interconnecting the lamp cans 92. The upper crossbar 110 is generally rectangular and tubular in shape. The upper crossbar 110 extends laterally and disposed between upper ends of the lamp cans 92. The upper crossbar 110 is made of a rigid material such as plastic. The upper crossbar 110 is secured to each of the lamp cans 92 by suitable means such as welding. The upper crossbar 110 is secured to the radiator support 16 by suitable means such as welding or fasteners (not shown).

The lamp can reinforcement and radiator support assembly 90 includes a grille 112. The grille 112 extends laterally and is generally rectangular in shape. The grille 112 is made of plastic material. The grille 112 includes an upper flange 114 extending laterally and having a generally inverted "L" shape. The upper flange 114 is connected to the upper crossbar 110 by suitable means such as welding or fasteners (not shown).

The lamp can and radiator support assembly 10 includes the bumper fascia 94 attached to the grille 112. The bumper fascia 94 extends laterally and is generally rectangular in shape. The bumper fascia 94 is made of plastic material. The bumper fascia 94 may be formed integral with the grille 112 or be attached thereto by suitable means such as welding or fasteners (not shown). The bumper fascia 94 is connected to each of the lamp cans 92. The bumper fascia 94 is connected to a forward or front lower end of the lamp can 92. The bumper fascia 94 includes a projection 116 extending rearwardly and having a generally arrow or inverted "V" shape. Each of the lamp cans 92 have an aperture 118 extending therethrough and being generally rectangular in shape. The bumper fascia 94 is connected to the lamp can 92 by the projections 116 extending through the apertures 118 in the housing of the lamp cans 92. It should be appreciated that the grille 112 may be attached to lamp cans 92 through the bumper fascia 94 or have a lower flange similar to the upper flange 114 and attached to the lower crossbar 108 by suitable means such as welding or fasteners (not shown). It should also be appreciated that the bumper fascia 94 is conventional and known in the art.

In operation, the lamp cans 92 are connected to the extensions 96. The flanges on the extensions 96 are connected to the vehicle body 14. At assembly, the body 14 is adjusted to the radiator support 16 to reset the position of the lamp cans 92 relative to the body 14 of the motor vehicle 12. In addition, the bumper fascia 94 is connected to the lamp cans 92 to allow the lamp cans 92 to support the bumper fascia 94 in a cantilevered manner. It should be appreciated that the lamp cans 92 support the crossbars 108 and 110, which, in turn, support the grille 112. It should also be appreciated that the lamp cans 92 may be adjusted inwardly and outwardly, in turn, adjusts the position of the bumper fascia 94. It should further be appreciated that the radiator support 16 can be made of a suitable material other than magnesium to directly support the extensions 96 and lamp cans 92.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A lamp can and radiator support assembly for a motor vehicle comprising:

a radiator support for operative attachment to a forward end of the motor vehicle;

a pair of lamp cans attached to said radiator support; and at least one crossbar interconnecting said lamp cans;

a bumper fascia attached to said lamp cans; and said lamp cans being adjustable inwardly and outwardly relative to said radiator support for adjusting a position of said bumper fascia relative to a body of the motor vehicle.

2. A lamp can and radiator support assembly as set forth in claim 1 including an extension attached to each lateral side of said radiator support and having at least one cavity therein to receive one of said lamp cans.

3. A lamp can and radiator support assembly as set forth in claim 2 wherein said extension includes at least one aperture extending therethrough and communicating with said cavity.

4. A lamp can and radiator support assembly as set forth in claim 2 including at least one flange disposed on each lateral end of said extension and adapted to be connected to a body of the vehicle.

5. A lamp can and radiator support assembly as set forth in claim 2 wherein each of said lamp cans have at least one projection and said extension has at least one aperture to receive said at least one projection.

6. A lamp can and radiator support assembly as set forth in claim 2 wherein said extension is integral, unitary, and one-piece with said radiator support.

7. A lamp can and radiator support assembly as set forth in claim 1 including an upper crossbar extending laterally between an upper end of said lamp cans and a lower crossbar extending laterally between a lower end of said lamp cans.

8. A lamp can and radiator support assembly as set forth in claim 1 wherein said at least one crossbar comprises an upper crossbar extending laterally and interconnecting an upper end of said lamp cans.

9. A lamp can and radiator support assembly as set forth in claim 1 wherein said at least one crossbar comprises a lower crossbar extending laterally and interconnecting a lower end of said lamp cans.

10. A lamp can and radiator support assembly as set forth in claim 1 wherein said radiator support being of a magnesium or a magnesium alloy material.

11. A lamp can and radiator support assembly for a motor vehicle comprising:

a radiator support for operative attachment to a forward end of the motor vehicle;

an extension attached to said radiator support and having at least one cavity therein; and a lamp can disposed in said at least one cavity and attached to said extension; and a bumper fascia attached to said lamp can in a cantilevered manner.

12. A lamp can and radiator support assembly as set forth in claim 11 wherein said bumper fascia extends laterally.

13. A lamp can and radiator support assembly as set forth in claim 12 wherein said bumper fascia is attached to a forward lower end of said lamp can.

14. A lamp can and radiator support assembly as set forth in claim 11 wherein said bumper fascia is made of a plastic material.

15. A lamp can and radiator support assembly as set forth in claim 11 wherein said bumper fascia has at least one projection extending rearwardly and said lamp can has an aperture extending therethrough, said projection extending through said aperture to attach said bumper fascia to said lamp can.

16. A lamp can and radiator support assembly as set forth in claim 11 including at least one crossbar extending laterally and connected to said lamp can.

17. A lamp can and radiator support assembly as set forth in claim 16 including a grille attached to said at least one crossbar and said bumper fascia attached to said grille.

18. A lamp can and radiator support assembly as set forth in claim 17 wherein said bumper fascia and said grille are integral and unitary.

19. A lamp can and radiator support assembly for a motor vehicle comprising:

a radiator support for operative attachment to a forward end of the motor vehicle;

a pair of extensions spaced laterally and attached to said radiator support, each of said extensions having a cavity therein;

a pair of lamp cans, one of said lamp cans being disposed in said cavity and attached to one of said extensions;

at least one crossbar interconnecting said lamp cans and attached to said radiator support;

a bumper fascia attached to said lamp cans in a cantilevered manner; and said lamp cans being adjustable inwardly and outwardly relative to said radiator support for adjusting a position of said bumper fascia relative to a body of the motor vehicle.

* * * * *